US006863480B1

(12) United States Patent
Taylor

(10) Patent No.: US 6,863,480 B1
(45) Date of Patent: Mar. 8, 2005

(54) ROUTER PLUNGE DEPTH ADJUSTMENT MECHANISM

(75) Inventor: Mike Taylor, Alamo, TN (US)

(73) Assignee: Porter-Cable Corporation, Jackson, TN (US)

(*) Notice: Subject to any disclaimer, the term of this patent is extended or adjusted under 35 U.S.C. 154(b) by 0 days.

(21) Appl. No.: 10/264,024

(22) Filed: Oct. 3, 2002

Related U.S. Application Data

(60) Provisional application No. 60/401,647, filed on Aug. 6, 2002.

(51) Int. Cl.[7] .................................................. B23C 1/20

(52) U.S. Cl. ....................... 409/182; 409/218; 409/210; 144/136.95

(58) Field of Search ................................ 409/181, 182, 409/185, 210, 218; 144/136.95, 154.5; 81/121.1, 177.2, DIG. 5

(56) References Cited

U.S. PATENT DOCUMENTS

| | | | | |
|---|---|---|---|---|
| 4,281,694 | A | 8/1981 | Gorman | 144/134 D |
| 4,316,685 | A | 2/1982 | George | 409/182 |
| 4,410,022 | A | 10/1983 | Peterson | 144/1 F |
| D286,131 | S | 10/1986 | Yamamoto | D8/67 |
| 4,652,191 | A | 3/1987 | Bernier | 409/182 |
| 4,770,573 | A | 9/1988 | Monobe | 409/182 |
| 4,836,720 | A | 6/1989 | Hadden | 408/112 |
| 4,938,264 | A | 7/1990 | Ferenczffy | 144/134 D |
| 4,938,642 | A | 7/1990 | Imahashi et al. | 409/182 |
| 5,094,575 | A | 3/1992 | Kieser et al. | 409/182 |
| 5,139,061 | A | 8/1992 | Neilson | 144/134 A |
| 5,143,494 | A | 9/1992 | McCurry | 409/182 |
| 5,191,921 | A | 3/1993 | McCurry | 144/134 D |
| 5,207,253 | A | 5/1993 | Hoshino et al. | 144/136 C |
| D340,174 | S | 10/1993 | Hoshino et al. | D8/67 |
| 5,308,201 | A | 5/1994 | Wilson et al. | 409/134 |
| 5,353,852 | A | 10/1994 | Stolzer et al. | 144/134 D |
| 5,574,620 | A | 11/1996 | Grimm et al. | 361/282 |
| 5,590,988 | A | 1/1997 | Rusconi | 409/182 |
| 5,590,989 | A | 1/1997 | Mulvihill | 409/182 |
| 5,671,789 | A | 9/1997 | Stolzer et al. | 144/154.5 |
| 5,685,676 | A | 11/1997 | Johnson | 409/182 |
| 5,723,089 | A | 3/1998 | Chijiwa et al. | 420/104 |
| 5,725,036 | A | 3/1998 | Walter | 144/135.2 |
| 5,845,688 | A | 12/1998 | Qian | 144/252.1 |
| 5,853,274 | A | 12/1998 | Coffey et al. | 409/182 |
| 5,918,652 | A | 7/1999 | Tucker | 144/371 |
| D416,460 | S | 11/1999 | Bosten et al. | D8/67 |
| 5,988,241 | A | 11/1999 | Bosten et al. | 144/154.5 |
| 5,998,897 | A | 12/1999 | Bosten et al. | 310/89 |
| 6,065,912 | A | 5/2000 | Bosten et al. | 409/134 |
| 6,079,915 | A | 6/2000 | Bosten et al. | 409/182 |
| 6,113,323 | A | 9/2000 | Bosten et al. | 409/182 |
| 6,139,229 | A | 10/2000 | Bosten et al. | 409/182 |
| 6,237,657 | B1 | 5/2001 | Qian | 144/252.1 |
| RE37,247 | E | 6/2001 | Blickhan et al. | 409/137 |
| 6,261,036 | B1 | 7/2001 | Bosten et al. | 409/182 |
| 6,318,936 | B1 | 11/2001 | McFarlin, Jr. et al. | 409/131 |
| 6,488,455 | B1 * | 12/2002 | Staebler et al. | 409/182 |
| 2004/0194854 | A1 | 10/2004 | McDonald et al. | |

* cited by examiner

*Primary Examiner*—A. L. Wellington
*Assistant Examiner*—Dana Ross
(74) *Attorney, Agent, or Firm*—Suiter West PC LLO

(57) ABSTRACT

The present invention is directed to a mechanism and method for providing base end plunge router depth adjustment, such as when a router is utilized with a router table. The apparatus and method of the present invention permits accurate and efficient depth adjustment when utilizing a router with a router table. A router depth adjustment device includes an adjustment knob and indexer, so users are provided with the ability for measured depth adjustment.

7 Claims, 8 Drawing Sheets

ROUTER PLUNGE DEPTH ADJUSTMENT MECHANISM

CROSS REFERENCE

The present application claims priority to U.S. Provisional Patent Ser. No. 60/401,647, entitled: Router Plunge Depth Adjustment Mechanism, filed on Aug. 6, 2002 which is hereby incorporated in its entirety.

FIELD OF THE INVENTION

The present invention relates to the field of hand tools and particularly to an apparatus and method for permitting plunge router depth adjustment from a base end.

BACKGROUND OF THE INVENTION

Plunge routers utilize various systems for changing the maximum depth to which the bit will advance. Typically, depth adjustment systems are mounted to permit ready access when the router is orientated with the motor housing orientated upwardly. Difficulties may occur when a user wishes to utilize plunge routers with a router table. When a plunge router is utilized with a router table, the router is orientated with the motor housing in a downward direction. Adjusting the maximum depth of cut may be difficult when using a router table because the table extends beyond the router base to support the workpiece.

For instance, plunge routers may include a coarse adjustment mechanism to permit large changes in the maximum depth of cut and a fine adjustment mechanism. Previous coarse adjustment mechanisms fail to permit ease of access. For example, a coarse adjustment mechanism such as a set screw or thumb screw may be difficult to adjust when the plunge router is orientated with the motor housing in a downward direction, such as when mounted under a table. Additionally, coarse adjustment mechanisms utilizing screws may be difficult to secure while the user is attempting to adjust the router against a spring while setting the coarse plunge mechanism.

Additionally, providing plunge depth adjustment from a base end is problematic. For instance, a depth adjustment mechanism disposed in or connected to the router base may cause difficulties or prohibit switching base plates. Adjustment mechanisms, and particularly fine adjustment mechanisms, connected to the base may become damaged, fouled with debris such as sawdust, and the like. Adjustment mechanisms mounted to the base may increase manufacturing expense. An adjustment mechanism permitting adjustment for the base end may not permit ease of adjustment from the motor housing end, for example when a plunge router is disposed with the motor housing orientated upwardly.

Further, router table users often reach under the table to adjust router depth or remove the router from the table. Removing the router from the table may be time consuming. Attempting to change router depth, while the router is mounted under the table, may be difficult and lead to imprecision and user dissatisfaction. Previous router devices fail to provide accurate depth adjustment. For instance, when adjusting either a standard router or a plunge router mounted under a router table the user often is forced to guess at the adjustment needed and then utilize a tape measure to check for correct adjustment.

Therefore, it would be desirable to provide an apparatus and method for permitting plunge router depth adjustment from a base end without the difficulties previously experienced.

SUMMARY OF THE INVENTION

Accordingly, the present invention is directed to an apparatus and method for providing plunge router depth adjustment, such as when a router is utilized with a table. The apparatus and method of the present invention permits easy, accurate depth adjustment from the base end of a router or when a router is utilized with a table.

In a first aspect of the invention, a base end plunge router adjustment mechanism includes a first column portion mounted to a base with an aperture permitting access to a mechanical connection on a threaded rod extending from a second column portion into the first column portion. A nut is mounted to the rod so the nut is capable of traveling linearly along the rod without rotating within the first column portion.

In a further aspect of the invention, a router depth adjustment device includes a shaft with a handle on an end and a mechanical connection on the opposing end. An adjustment knob and an indexer are included in the device. The adjustment knob is attached such that the knob may travel along the shaft. The indexer is pivotally mounted to the knob.

In an additional aspect of the invention, a method for adjusting a router utilized with a router table includes coupling a depth adjustment device to a threaded shaft disposed in a router. An indexer is aligned with the router table. An adjustment knob is utilized to rotate the shaft resulting in a change in cut depth.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of present invention, examples of which are illustrated in the accompanying drawings.

Referring generally now to FIGS. 1 through 7, exemplary embodiments of the present invention are shown. The system and method of the present invention overcome the difficulties associated with typical plunge router adjustment mechansims, such as plunge router is utilized with a router table.

Figure 1:
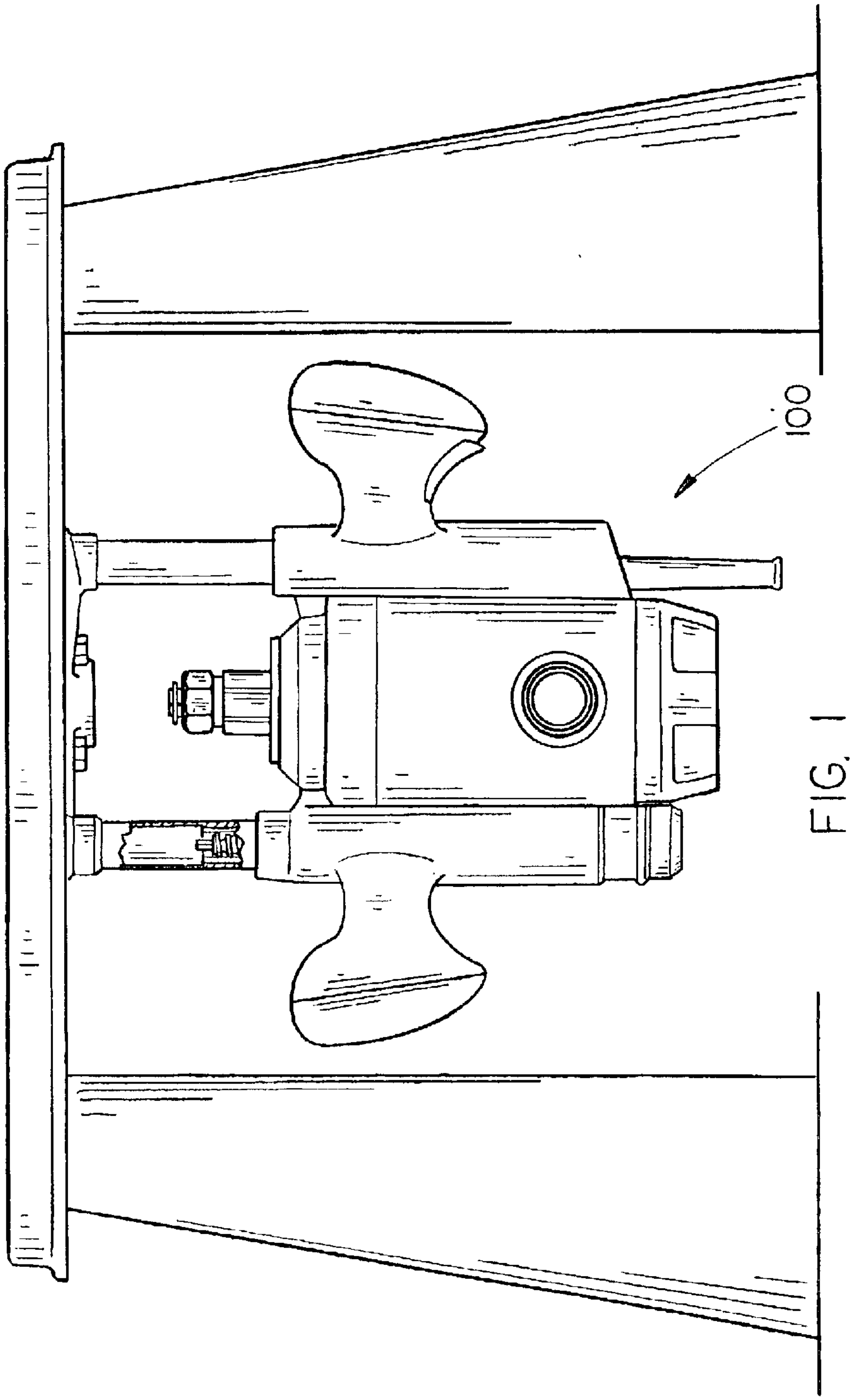
FIG. 1 is a perspective cut-a-way view of a plunge router, utilized in conjunction with a router table, employing a mechanism for providing base end adjustment.
Figure 2A:
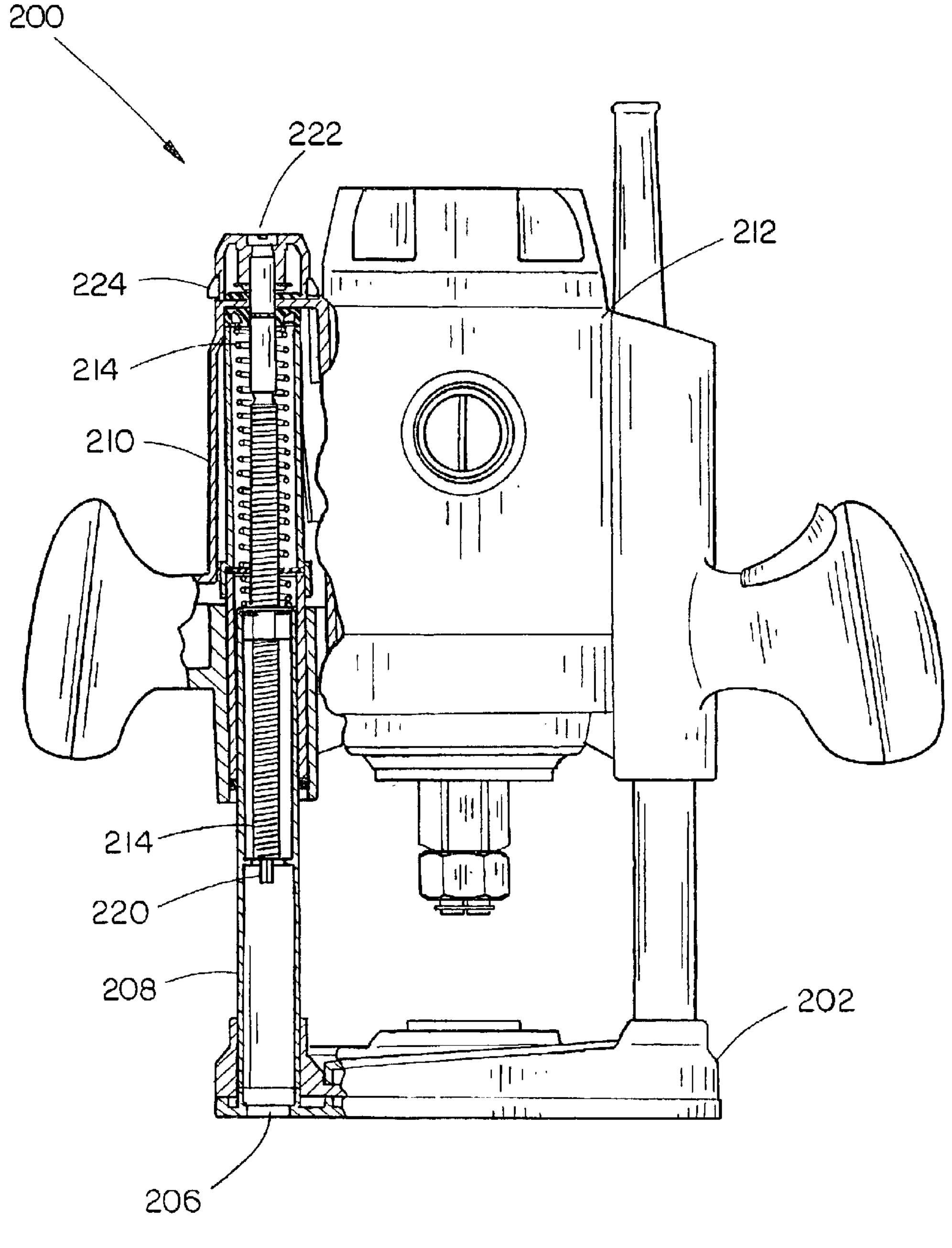
FIG. 2A is a perspective view of a mechanism for providing base end depth adjustment.
Figure 2B:
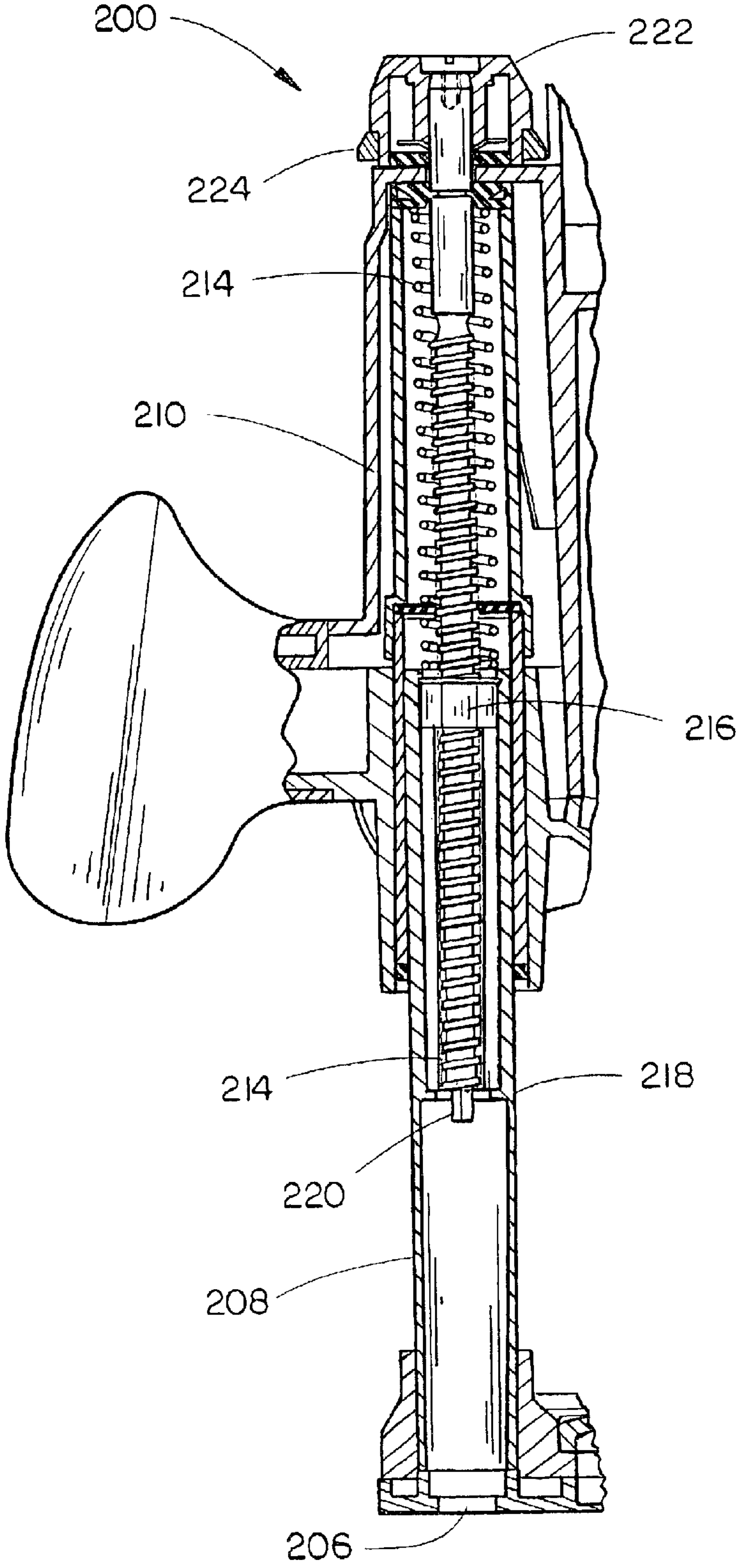
FIG. 2B is an enlarged view of the mechanism of FIG. 2A.

Referring to FIGS. 1, 2A and 2B, a mechanism 200 of the present invention is suitable for utilization in a plunge router 100. The mechanism 200 for permitting base end plunge depth adjustment of a router is shown. A base 202 is included in the mechanism 200. The base 202 contains an aperture 206 suitable for permitting access to the interior of a first column portion 208 connected to the base 202. For example, the aperture 206 is sufficient to allow a wrench, such as an Allen wrench to access the interior recess of the first column portion 208. The first column 208 includes an aperture through the side opposite the connection between the first column 208 and the base 202.

A second column portion 210 is adjustably connected to the first column 208. For example, the second column portion is capable of receiving the first column 208 in an interior recess included in the second column 210 so as to permit plunging action. The second column 210 is formed integral to a motor housing 212. In further embodiments, the second column 210 is formed separately and connected to the motor housing 212. The mechanism 200 is suitable for at least partially supporting the motor housing when in an upright orientation. For example, a plunge router employing the present mechanism may include an additional column assembly for at least partially supporting the motor housing when upright.

A threaded rod 214 is included in the mechanism 200. The rod 214 is pivotally connected, adjacent the first end of the rod 214, to the second column 210 opposite the first column 208. The pivotal connection between the threaded rod 214 and the second column 210 permits the rod 214 to rotate without traveling along the rod 214. For instance, the rod 214 includes a groove around the circumference of the rod, a smooth portion bounded by opposing washers, see generally FIG. 3, and the like for pivotally connecting the rod 214 through the aperture included in the second column 210.

A mechanical connection is formed on the second end of the rod 214. For example, the mechanical connection is a hex head 220. In further embodiments, the mechanical connection is a socket for receiving an Allen wrench, a square socket for receiving a square bit, a slot head, a Phillips head, a Torx head, and the like. For instance, the mechanical connection is suitable for connecting with a corresponding mechanical connection included on a wrench for adjusting the rod 214. See FIG. 4 wherein a wrench 430 with a hex socket connection 432 is utilized for adjusting plunge depth.

Figure 3:
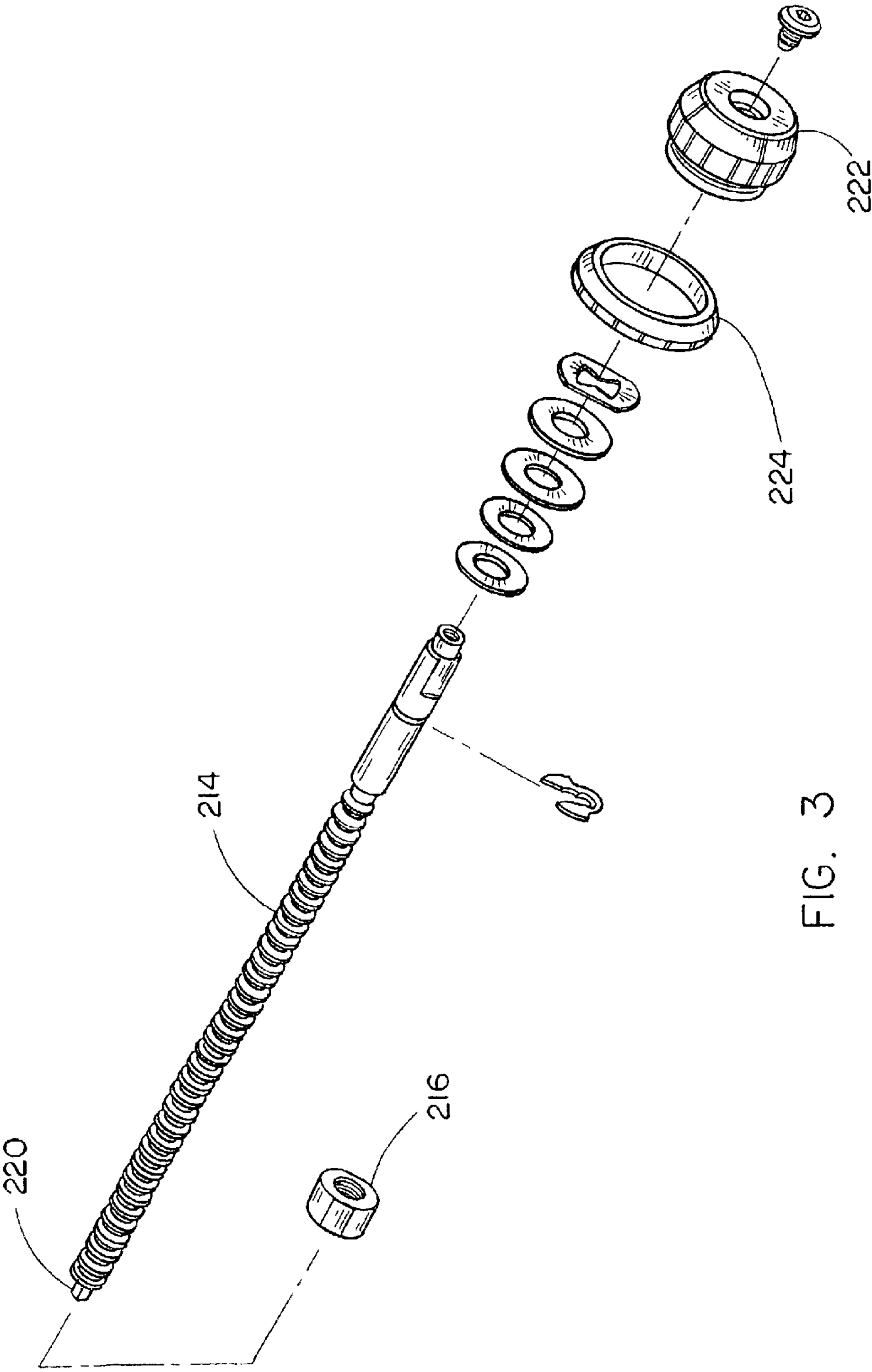
FIG. 3 is a perspective view of an apparatus for providing base end plunge router depth adjustment, including a hex-head socket wrench.

Referring to FIGS. 2A, 2B and 3, a nut 216 is threaded on to the threaded rod 214. The nut 216 is disposed in the recess included in the first column 208 between the end of the first column 208 connected to the second column 210 and a stop 218. The interior recess of the first column 208 prevents the nut 216 from rotating with respect to the column while permitting the nut 216 to travel along the rod 214. For instance, the first column interior recess is hex shaped to receive a hex shaped nut.

The threaded rod 214 passes through an aperture on the end of the first column 208 opposite the base 202. The aperture allows passage of the rod 214 without contact, thus permitting plunging action. A stop 218 is connected to the interior of the first column 208. The stop 218 forms the maximum plunge depth when contacted by the nut 216. For instance the stop 218 is a lip, a screw secured to the first column portion and the like for arresting the nut 216, while permitting passage of the rod and/or a wrench.

Figure 4:
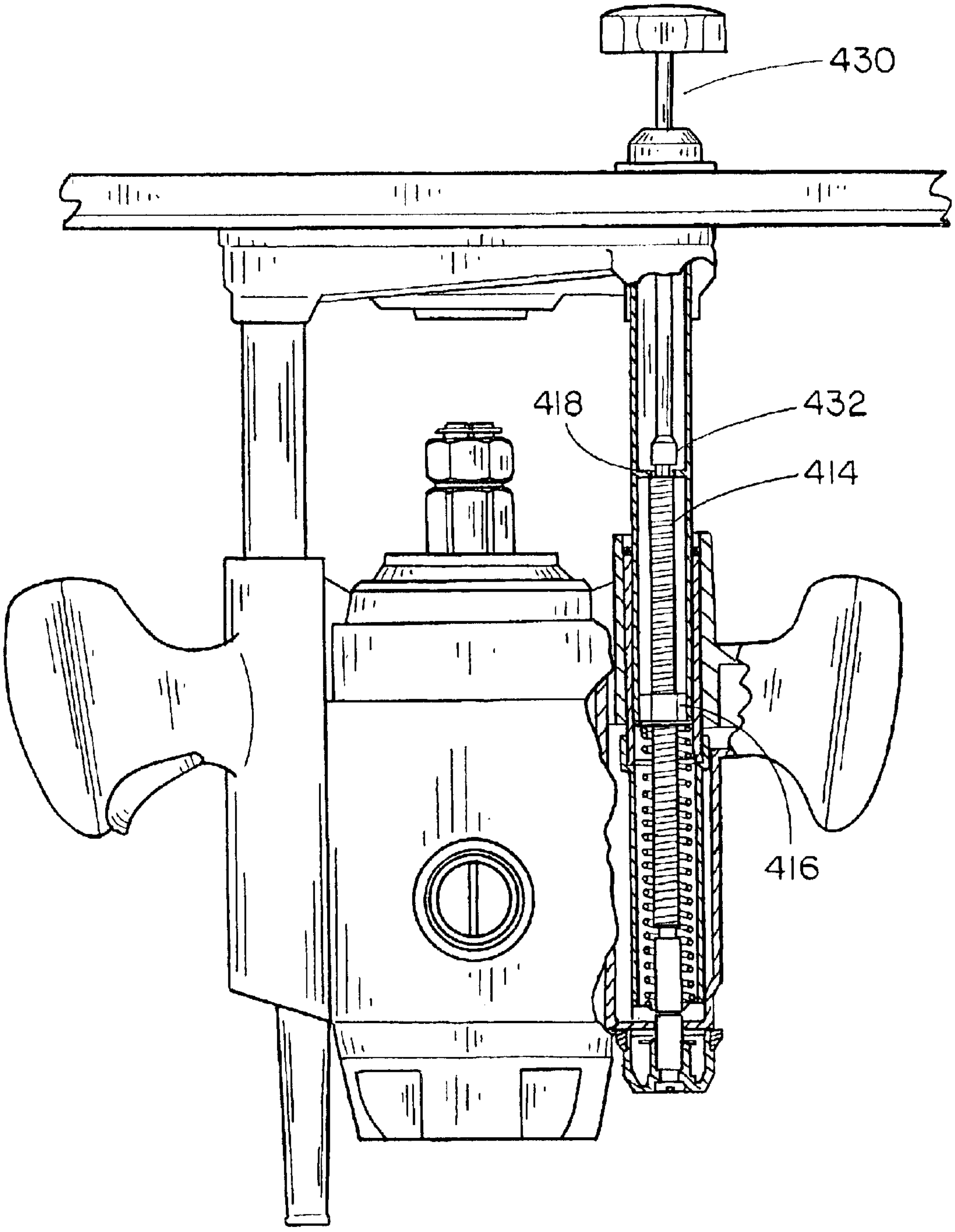
FIG. 4 is an exploded view of a threaded rod including a pivotal connection mechanism for use in permitting base end plunge depth adjustment.

Referring now to FIG. 4, for instance, should a user wish to increase the plunge depth from the base end an eighth of an inch (⅛"), the user would rotate the rod 314 via a wrench 430 until the nut 416 traveled the desired distance. In a further embodiment, a full rotation of the rod 414 results in an eighth of an inch (⅛") travel of the nut 416 along the rod 314. Setting the pitch of the threads so a single rotation of the rod is equal to an eighth of an inch (⅛") of linear travel is advantageous due to the common occurrence of ⅛", 1/16", 1/32" and multiples thereof in router operation. For instance, a user knows that a one-half rotation equals approximately a 1/16" adjustment. The stop 418 permits passage of the rod 414 while preventing the nut 416 from passing. Disposing the second end of the threaded rod 414 in the first column portion 408 permits ease of adjustment and lower manufacturing costs than base mounted adjustment mechanisms.

Referring to FIG. 2, in an additional aspect of the invention, an adjustment knob 222 is connected to the first end of the rod 214. The adjustment knob 222 is mated to the rod 214 such that rotation of the knob 222 results in a corresponding rotation of the rod 214. For example, the knob 222 is secured to the rod via a screw. In another embodiment, a knob aperture and the first end of the rod are shaped to interlock, such as by including a square shaped the rod end and square knob aperture, and the like for securing the threaded rod/adjustment knob.

In further embodiments, an adjustment collar 224 indicating various adjustments may be included. For example, the collar 224 includes a series of depth adjustments for aiding in maximum plunge depth adjustment. In the example, the collar 224 may have a series of adjustment marks, such as 1/64", 1/32", 1/16" and the like for aligning with a corresponding mark on the knob/motor housing, for aiding depth adjustment.

A biasing means, such as a compression spring 214, is included in the second column 210. The spring 214 provides a force suitable for at least partially supporting the motor housing 212 in an extended orientation, while permitting a user the ability to plunge a router in which the mechanism 200 is included.

A base plate 226 may be attached to the base 202. Those of ordinary skill in the art will appreciate that various base plates may be utilized to achieve desired functionality, such as to provide a collar for following a template, providing radius cutting ability, aiding in connecting the base to a router table and the like. Suitable base plates include an aperture to allow access to the interior of first column 208 or may be designed so as to not interfere with operation of the mechanism 200.

In further embodiments, a removable cap, a penetrable rubber gasket or the like for preventing the ingress of debris into a first column portion is included in the mechanism 200.

Figure 5A:
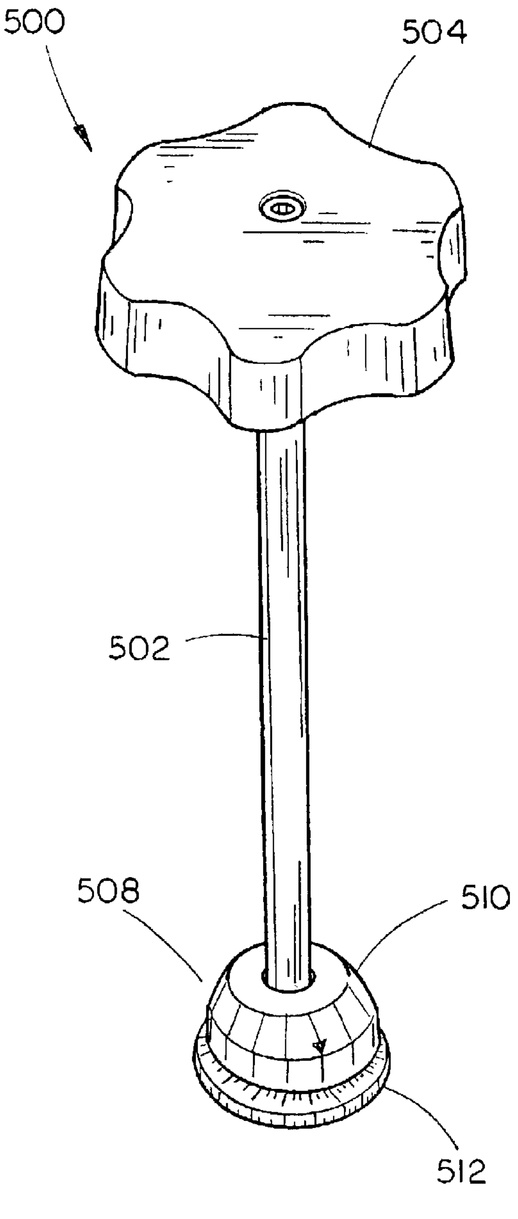
FIG. 5A is a perspective view of a wrench, including a depth guage, suitable for utilization in base end depth adjustment.
Figure 5B:
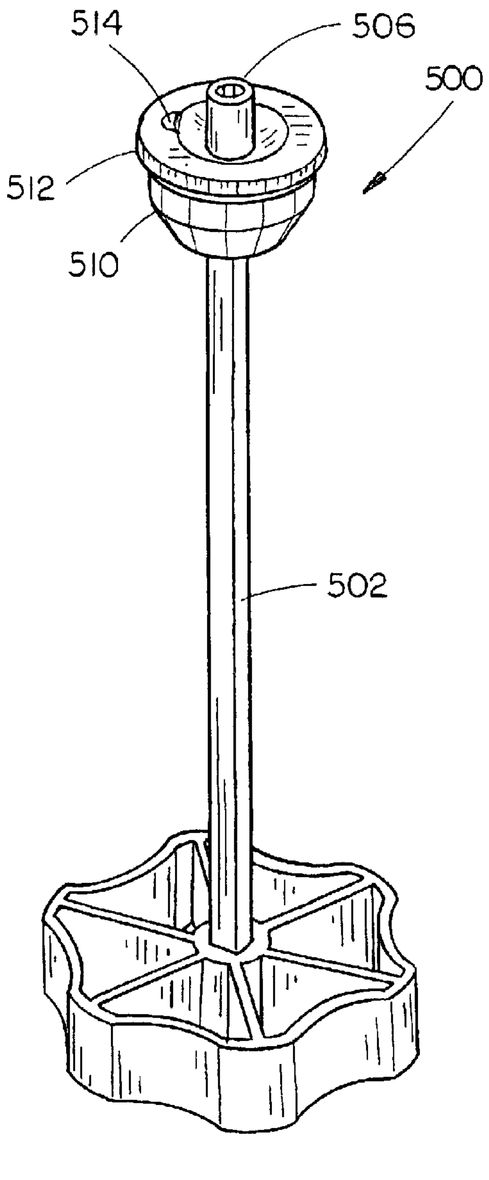
FIG. 5B is an inverse view of the wrench of FIG. 5A.

Referring to FIGS. 5A and 5B, a router depth adjustment device 500 is described. Those of ordinary skill in the art will appreciate that the device 500 of the present embodiment may be implemented with both standard and plunge type routers. For instance, the depth adjustment device may be implemented with a router, either plunge or standard, when utilized with a router table, such as may be seen generally with regards to FIG. 1.

The device 500 includes a shaft 502. A handle 504 is connected on an end of the shaft. Various handle types, such as T-handles, handles for aiding in grasping and the like may be implemented without departing from the scope and spirit of the present invention.

A mechanical connection is secured to the shaft opposite the handle 504. In the current embodiment, the mechanical connection is a socket 506 for receiving a hex-head included in a router. In further embodiments, the mechanical connection is a hex head, a square socket for receiving a square bit, a slot head, a Phillips head, a Torx head, and the like.

An adjustment knob 510 is mounted to the shaft 502. The knob 510 is connected such that the knob is permitted to slide or traverse along the length of the shaft. In additional embodiments, the connection between the shaft and the knob permits travel along the shaft while the knob remains pivotally fixed. For instance, the shaft includes a flattened zone along the longitudinal column for interacting with a complimentary zone included in the knob 510, thus resulting in the knob remaining rotationally fixed. Moreover, when the device 500 is implemented with a router, such as described previously, the user may rotate the knob 510, thus resulting in a change in plunge depth.

An indexer 512 is pivotally connected to the adjustment knob 510. The indexer 512 is generally ring shaped and includes graduations to aid the user in adjusting the depth of cut, in the case of a standard router, or maximum plunge depth for a plunge router. For instance, the indexer 512 indicates a full rotation will result in a ⅛" (eighth of an inch) variation in depth. Those of skill in the art will appreciate that the change in depth of the router's cutting tool is a function of the pitch of the threading included in a router. It is the intention of this application to encompass and include such variation. For instance, a router may be threaded so a single rotation results in a (¼') quarter inch of linear travel, thus the indexer graduations would correspond to a ¼" change per rotation.

In additional embodiments, the indexer 512 includes a mechanical interconnect. For example, a mechanical interconnect may be a rib (multiple ribs are shown 514), a pin, such as a rounded protrusion, a gasket, such as an elastomer gasket, with a high coefficient of friction, and the like for aiding in maintaining orientation of the indexer. Preferably, the mechanical interconnects included on the indexer 512 extend outwardly parallel to the axis of the shaft 502 so that a router table or insert included with a router table may receive the interconnect without disruptions of the work surface. For instance, a rib 514 is included on an indexer. The rib 514 may be received by a recess included in a router table. Thus, an indexer 512 may be secured in a desired orientation while an associated adjustment knob is manipulated.

In further implementations, an elastomeric gasket, such as a rubber plug, is positioned between an adjustment knob and an indexer. The plug may act to permit the knob and indexer to rotate together or independently, depending on user manipulation.

For instance, a user may choose to manipulate the indexer and knob in unison thus the plug may be compressed slightly between the knob and indexer, resulting in uniform rotation.

Figure 6B:
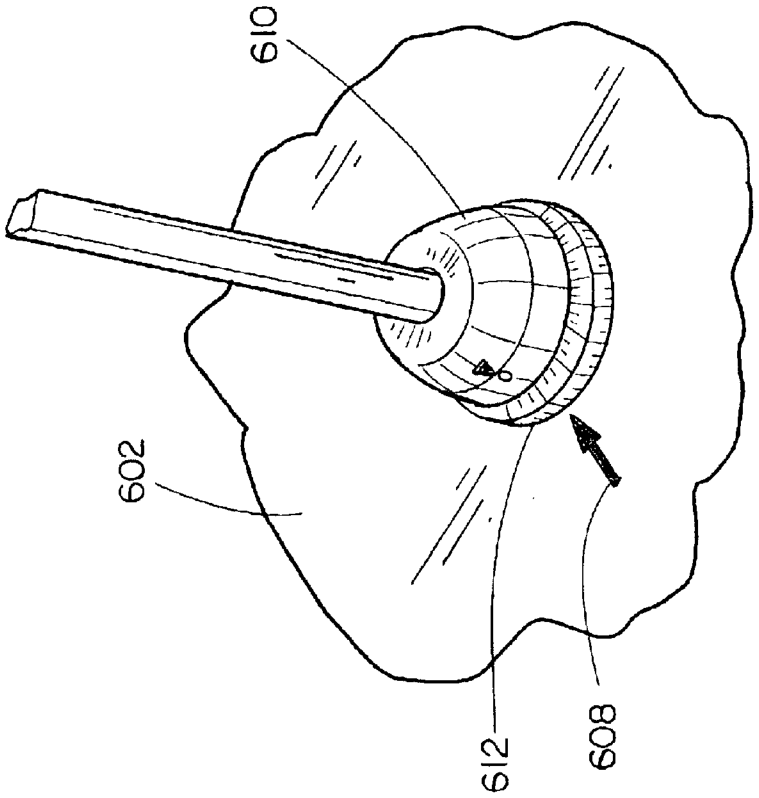
FIG. 6B is a perspective view of a router table utilized in conjunction with a router depth adjustment device.
Figure 6A:
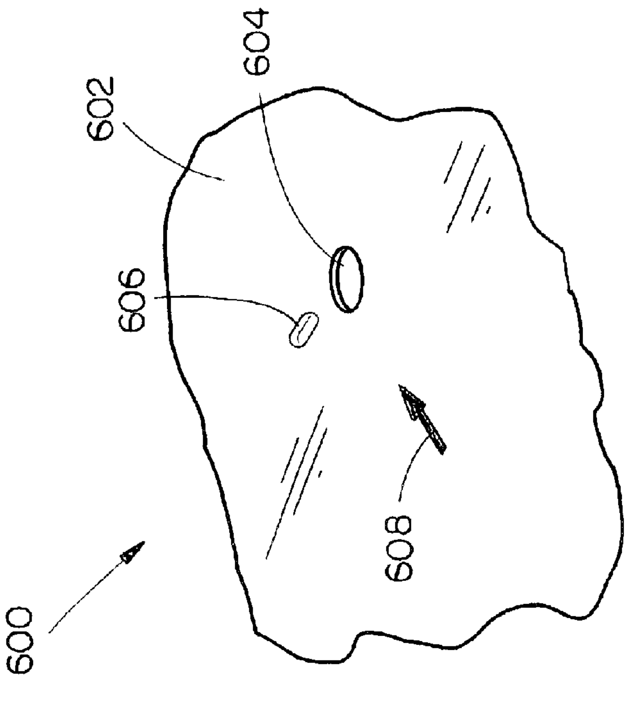
FIG. 6A is a perspective view of a router table capable of measured router depth adjustment.

Referring to FIGS. 6A and 6B, a router table 600 is shown. The router table 600 of the present embodiment permits measured depth adjustment from the workpiece side.

The router table 600 includes a support 602. An aperture 604 extends through the support 604. The aperture 604 permits access to a depth adjustment mechanism included on a standard or plunge router. For example, the aperture permits access to a router mounted below the support, such as may be seen generally in FIG. 1.

A mechanical interconnect recess is formed in the support 602 adjacent to the aperture 604. A recess 606, for accepting a rib, such as a rib included on device 500 is shown. A recess may be formed to accept a specific mechanical interconnect, such as a pin and the like included on a wrench for manipulating router depth. An interconnect recess allows for alignment of depth adjustment ring or indexer with respect to the table. Referring to FIG. 6B, for example, a user may wish to align a zero mark on the indexer with an indicator or alignment mark 608 on the surface of the support 602 and then rotate an adjustment knob 610 to achieve a desired change in plunge depth. The user may rotate the adjustment knob until an alignment point on the knob aligns with the desired linear change.

The aperture and recess are formed in the support on the workpiece side of the support. Those of ordinary skill in the art will appreciate that the aperture and adjacent structures may be formed as part of an insert into a router table, so as to permit retrofitting, for cost effective manufacture and the like without departing from the scope and spirit of the present invention.

Figure 7:
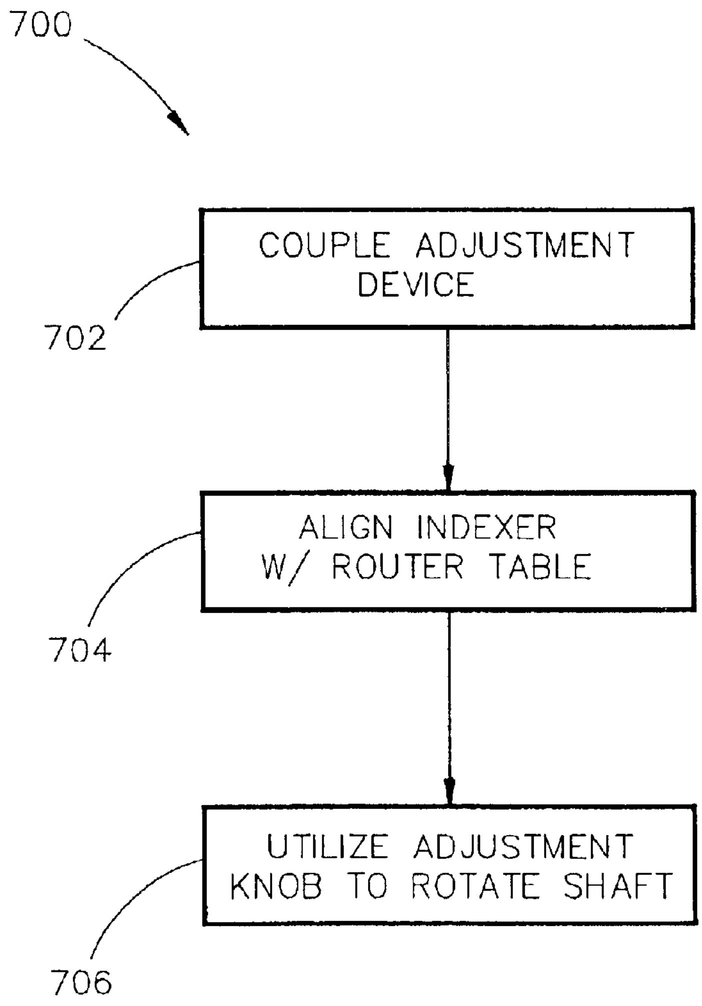
FIG. 7 is a flow diagram illustrating a method for permitting plunge router base end depth adjustment.

Referring to FIG. 7, a flow chart depicting a method 700 for adjusting a router utilized with a router table. Initially, a router adjustment device is coupled 702 to a mechanical connection included on a threaded shaft disposed in a column. For instance, the adjustment device is inserted through an aperture included in the router table/base. An indexer is aligned with the router table 704. For example, a mechanical interconnect is matched with a corresponding interconnect included on the router table. The adjustment knob is utilized 706 to rotate the shaft such that the rotation of the shaft results in a measured depth of cut change. For instance, the shaft is rotated via the knob so a 1/32" change occurs.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented It is believed that the apparatus and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A router table depth adjustment system, comprising:

a shaft with a first and a second end;

a handle disposed on the first end of the shaft, for rotating the shaft;

a mechanical connection disposed on the second end;

a depth adjustment indexing system including:

an adjustment knob traversely mounted to the shaft; and an indexer, including a mechanical interconnect, pivotally mounted to the adjustment knob;

a support surface, including a first and a second side with an aperture therethrough suitable for receiving the mechanical connection, said support surface including:

a mechanical interconnect formed in the first side, adjacent to the aperture, for receiving the mechanical interconnect included on the indexer; and an indicator adjacent the aperture suitable for aligning the depth adjustment indexing system; and means for supporting the support surface coupled to the second side;

wherein the router table depth adjustment system permits measured router depth adjustment from the first side.

2. The router table depth adjustment system of claim 1, wherein an indexer interconnect is at least one of a rib and a pin.

3. The router table depth adjustment system of claim 1, further comprising a rubber plug disposed between the adjustment knob and indexer for alternately securing and unsecuring the indexer to the adjustment knob.

4. The router table depth adjustment system of claim 1, wherein the adjustment knob is mounted to the shaft, such that the knob rotates with rotation of the shaft.

5. The router table depth adjustment system of claim 1, wherein the mechanical connection is a hex head.

6. The router table depth adjustment system of claim 1, wherein the mechanical connection is a socket.

7. The router table depth adjustment system of claim 1, wherein the mechanical connection is at least one of a slot head, a Phillips head and a Torx head.

* * * * *